May 7, 1940. O. C. MAYS Re. 21,444

APPARATUS FOR SHOOTING WELLS

Original Filed Aug. 15, 1936

Orland C. Mays
INVENTOR

BY Loyal J. Miller
ATTORNEY

Reissued May 7, 1940

Re. 21,444

UNITED STATES PATENT OFFICE 21,444

APPARATUS FOR SHOOTING WELLS

Orland C. Mays, Kermit, Tex.

Original No. 2,108,174, dated February 15, 1938, Serial No. 96,182, August 15, 1936. Application for reissue February 14, 1940, Serial No. 318,960

9 Claims. (Cl. 102—4)

My invention is a method of and apparatus for "shooting" deep wells. It relates particularly to the method of and apparatus for anchoring "shots" in the well.

In present practice, premature explosion of the explosive charge is not at all unusual. A number of "charges" are secured together in a string, one above the other, and lowered into the well. When the container holding the lowermost charge seats on the well obstruction, it is forced to carry the weight of all the other containers holding like "charges" or "shots." Often times the weight is too great, the container buckles, and premature explosion results, doing considerable damage to the well, and subjecting many people to possible loss of life.

Another disadvantage of present day methods is the fact that there is no means in use at present to prevent various ones of the shots from being moved up or down in the hole, after they have been "set down" on the obstruction. This movement is due to sand entering the hole under pressure. It sometimes forces its way far up in the hole, carrying a number of "shots" with it. As a result when the shots are detonated, the shots which have been moved up in the hole either explode at the wrong place, doing considerable damage, or else do not explode until tools are replaced in the hole, which explosion causes even more damage, and some times prevents further drilling in the well.

It is, therefore, the main object of my invention to obviate such damage to obstructed wells during the process of removing the obstruction, either because of premature explosion, delayed explosion, or explosion at the wrong place in the well.

Further objects of the invention are to provide an anchor which opens automatically under its own weight when its downward movement is obstructed; which anchors more firmly when weight or pressure is applied from above; and which, when anchored, withstands positively either upward or downward pressure.

Other objects of the invention will be apparent from the following specification when considered in connection with the one particular embodiment illustrated in the accompanying drawing, wherein.

Like characters of reference designate like parts in all the figures.

The preferred method of shooting wells according to the present invention contemplates the placing of suitable anchors at spaced intervals between adjacent "shots" of explosive, and allowing each anchor to receive and carry the load between it and the next anchor above.

Figure 3:
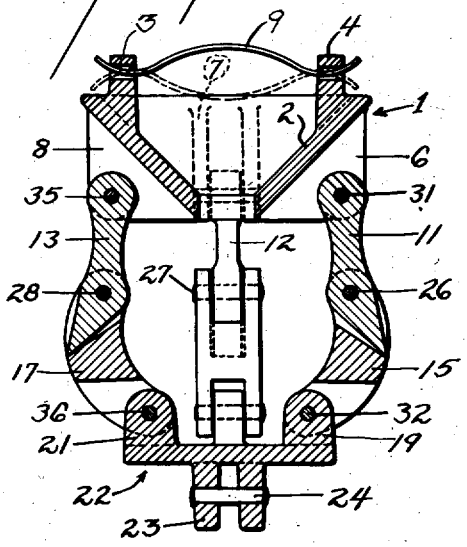
Fig. 3 is a detailed sectional view of the anchor in the position it would assume if suspended by its bail. The view is taken along the line 3—3 of Fig. 2.
Figure 2:
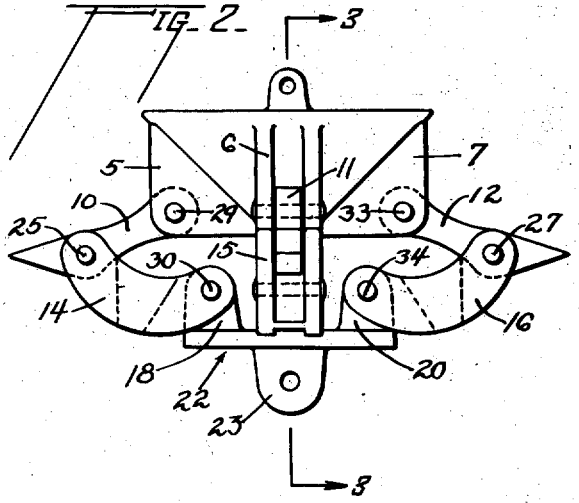
Fig. 2 is a side elevation of the anchor I prefer to use in connection with my method. In this view the anchor is shown "spread", or in an anchored position.

The preferred type anchor will first be described. Referring to Figs. 2 and 3 of the drawing, numeral 1 represents as a whole a shot seating head, having a truncated conical bore 2, two upstanding bail holding lugs 3 and 4, and four bifurcated lugs 5, 6, 7 and 8 spaced 90° from each other about the lower portion of the head 1. The head is equipped with a bail 9, the ends of which are anchored in through perforations in the lugs 3 and 4. It will be noted that the bail is free to revolve in the perforations, and that when the downward movement of the anchor stopped, the bail 9 would move to the position shown by the dotted lines in Fig. 3. The bail would thus act as a guide to cause a "shot" container attached to the bail to seat properly in the conical bore of the head 1. Pivoted respectively between the side portions of each of the bifurcated lugs 5, 6, 7 and 8 are flukes 10, 11, 12 and 13. Each fluke has a sharply tapered outer end for digging into and anchoring on the side wall of a well.

Pivotally attached to each of the flukes 10, 11, 12 and 13, intermediate their ends, are links 14, 15, 16 and 17, each being bifurcated at both ends, as clearly shown in Fig. 3. The opposite ends of the links 14, 15, 16 and 17 are pivotally connected to upstanding lugs 18, 19, 20 and 21 which are integrally carried on the upper surface of a bottom plate, designated as a whole by numeral 22. The bottom plate 22 also carries on its lower surface, centrally located, a bifurcated lug 23, the two side members of which carry through perforations, properly aligned, to receive a pin 24, which is easily removable therefrom to facilitate the attaching of a "shot" container bail thereto, between the side members of the lug.

Referring to Fig. 3, which illustrates the relative positions of the various parts as the device is lowered into a well, it will be noted that the free tip ends of the flukes contact the solid central portions of their respective links, thus preventing the pivot points 25, 26, 27 and 28 from reaching actual alignment with the respective pairs of pivot points 29 and 30, 31 and 32, 33 and 34, and 35 and 36. This relation is positively established in order that the least movement, or tendency to movement, of the head 1 and bottom plate 22 toward each other will cause the flukes 10, 11, 12 and 13 to be forced outward by the links 14, 15, 16 and 17. With this arrangement there is practically no resistance to free outward movement of the flukes.

The operation of my anchor will be explained in connection with my method, which will now be considered. As previously stated it is customary to attach a number of "shot" containers together, one above the other, for lowering into the well. The usual container holds approximately twenty quarts of nitroglycerin, or some other suitable explosive. The container is substantially cylindrical and has a conical bottom. Its upper end is open. Each container is fitted with a suitable wire bail at its top, as well as a suitable bail at its bottom. The lower ends are conical so that when the lowermost container seats on the obstruction in the well the conical lower end of the next container above will seat in its open upper end and so on up the string until each container is seated in the container below it. The containers are necessarily made of light gauge metal and are not capable of standing up under pressure from above.

Figure 1:
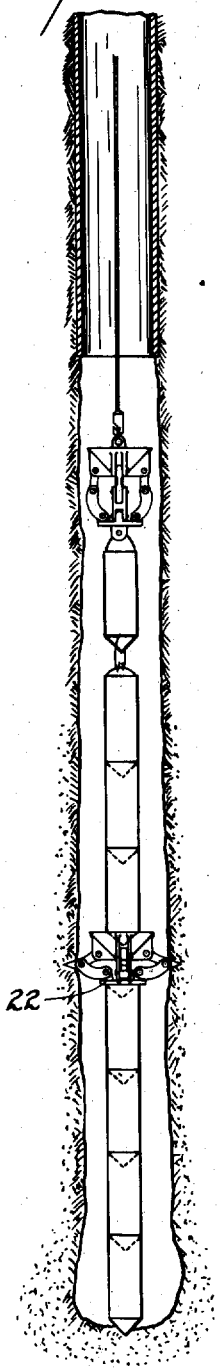
Figure 1 is a diagrammatic view of an obstructed well showing my particular method of placing and anchoring the "shots" in the well.

It is preferably my method to connect a plurality of the containers together in the usual manner, connect the lower end of one of my anchors to the bail of the top container, connect another series of containers to the bail 9 of my anchor and in this manner continue the insertion of anchors at spaced intervals throughout the entire string of "shot" containers. The spacing of the anchors will depend greatly on the weight of the liquid carried. I prefer to connect an anchor to the uppermost "shot" container as shown in Fig. 1 before the string is lowered into the well for shooting.

When the string of "shots" are thus prepared and the string lowered into the well, the anchors pass freely through the hole. When the lowermost shot seats on the obstruction the shots above it in turn seat on their adjacent containers and when the downward movement of the bottom plate 22 of the first anchor is stopped, the weight of the "shots" above this anchor causes the flukes to penetrate the side walls of the hole as shown by the lower anchor in Fig. 1. As the downward progress of each anchor in the string is stopped, it likewise anchors to the side wall of the hole.

If preferred each series of containers may be lowered into the well independent of the other series of containers and independent of the anchors. In this case, when the first series of containers rests on the obstruction, one of my anchors may be lowered until it rests on the top of the uppermost container; another series of containers may then be lowered until their weight rests on the anchor, and so on until a sufficient quantity of explosive has been placed in the well.

With the entire explosive column thus anchored it is not possible for sand to enter the hole and move any of the "shot" containers upward in the hole. Also, each anchor carries the weight of the containers between it and the next anchor above. In other words the lowermost container illustrated in Fig. 1 is carrying only the weight of the three "shot" containers above it. The lowermost anchor in the well is carrying the weight of the next three containers above it and the fourth container is in a position to seat in the container below it, thus stopping the downward progress of the top anchor, which will in turn open and anchor in the side walls of the well, as did the first anchor. The lower portion of the head 1 has a perforation at the point where the conical bore is truncated to allow any sand which may be passing downward in the well to pass freely therethrough. Also, in cases where the anchor is substantially as large in radius as the well, this perforation serves to relieve any gas pressure which may be in the well at the time the string is lowered.

With this method it will readily be seen that the anchors prevent any buckling of the "shot" containers, thus they prevent premature explosion of any part of the total "charge". By preventing either upward or downward movement of any of the "shot" containers, delayed explosion due to the separation of a part of the total "charge" from any other part is prevented. The result is a saving in money, time and expensive drilling operations, as well as considerable reduction in the danger in the shooting of wells. It will also be noted from Fig. 1 that in case an error is made and it is desired to withdraw the entire explosive charge from the well before setting off the charge the entire string may be freely raised again through the hole without obstruction from the anchors. This is true because as the weight from above is lifted from each anchor it normally assumes the position shown in Fig. 3, thus presenting no obstruction to the string of explosives as it is withdrawn from the well.

While I have described and illustrated a specific embodiment of the anchor I prefer to use in connection with my method, I am aware that numerous alterations and changes may be made therein and I do not wish to be limited except by the prior art and the scope of the appended claims.

I claim:

1. An anchor comprising an upper member having a central conical bore; a lower member in axial alignment therewith having a bail supporting element formed on its lower surface; a plurality of circumferentially disposed flukes pivoted about the lower end of said upper member; a like plurality of links radially positioned in alignment with said flukes, one end of each link being pivotally connected to one of said flukes intermediate its ends, and the other end of each of said links being pivotally connected about the periphery of said lower member.

2. A two way anchor comprising: a shot seating upper member of cup-like form having a central conical bore, a plurality of spaced flukes each having one end pivotally connected to said upper member; a lower member; and a like plurality of links, each having one end pivotally connected to said lower member and the other end pivotally connected to one of said flukes intermediate its ends whereby said links force the outer ends of said flukes away from said upper member when the upper and lower members approach each other.

3. Organization as described in claim 1 and: a bail for said upper member.

4. An anchor comprising: an upper member; a lower member in axial alignment therewith; a plurality of flukes pivotally connected to said upper member; a like plurality of links pivotally connected to the lower member; pivotal connections between the respective links and flukes at a point intermediate the ends of the latter; a lug carried by each link for contacting the free end of its respective fluke thereby to limit the relative pivotal movement of each link and fluke about their respective pivot points; a bail for said upper member; and a bail connection for said lower member.

5. An arrangement for shooting oil-wells consisting of a string of explosive charges connected together, a two-way, self-acting anchor means between certain of said charges in said string, whereby when the lowermost charges seat on an obstruction the weight of charges in said string above said anchor will automatically cause said anchor to operate to relieve the charges below said anchor from the weight of the charges thereabove.

6. An arrangement for shooting oil-wells consisting of a string of explosive charges connected together, a two-way self-acting anchor means between adjacent charges at intervals along the entire string, whereby when a charge below an anchor seats on an obstruction the weight of charges in said string above said anchor will automatically cause such anchor to operate to relieve the charges below such anchor from the weight of charges thereabove.

7. An arrangement for shooting oil-wells, consisting of a string of explosive charges connected together, a two-way, self-acting anchor means secured to the uppermost charge of said string, whereby opposing forces on opposite sides of said anchor will serve to cause said anchor to operate to hold said string of charges against movement in the oil well.

8. An arrangement for shooting oil-wells consisting of a string of explosive charges connected together, a self-acting anchor means between certain of said charges in said string, whereby when the lowermost charges seat on an obstruction the weight of charges in said string above said anchor will automatically cause said anchor to operate to relieve the charges below said anchor from the weight of the charges thereabove.

9. An arrangement for shooting oil-wells consisting of a string of explosive charges connected together, a self-acting anchor means between adjacent charges at intervals along the entire string, whereby when a charge below an anchor seats on an obstruction the weight of charges in said string above said anchor will automatically cause such anchor to operate to relieve the charges below such anchor from the weight of charges thereabove.

ORLAND C. MAYS.